United States Patent [19]
Belcher

[11] 3,979,856
[45] Sept. 14, 1976

[54] WIRE BASKET

[76] Inventor: James H. Belcher, 9432 Motsenbocker Road, Parker, Colo. 80134

[22] Filed: Apr. 7, 1975

[21] Appl. No.: 565,447

[52] U.S. Cl. ................................. 47/37; 220/19
[51] Int. Cl.² ................................. A01G 23/04
[58] Field of Search .............. 220/19; 47/34, 37

[56] References Cited
UNITED STATES PATENTS

| | | | |
|---|---|---|---|
| 681,066 | 8/1901 | Millingar | 47/34 |
| 879,613 | 2/1908 | Edwards | 47/37 |
| 1,464,534 | 8/1923 | Lovett | 47/37 |
| 3,316,675 | 5/1967 | Cartwright | 47/37 |

*Primary Examiner*—Robert E. Bagwill
*Attorney, Agent, or Firm*—H. W. Oberg, Jr.

[57] ABSTRACT

A wire basket for retaining excavated earthen balls, the basket having a plurality of spaced upright wires or "stakes" divergently arranged and connected to a plurality of spaced wire hoops or "wales" of successively increasing larger size and formed of a plurality of intersecting generally chordal segments that form angles which are increasingly larger with successively larger hoops.

16 Claims, 8 Drawing Figures

WIRE BASKET

BACKGROUND OF THE INVENTION

The invention relates to excavating, but more particularly, the invention relates to metallic receptacles of wire for retaining excavated earthen balls.

Wire type baskets are used by nurserymen to retain excavated earthen balls which usually contain a tree or other shubbery. The earthen balls are commonly dug by a powered spade and then transferred to the wire basket. Usually, liners such as of burlap are first disposed in the basket to help further retain the earthen balls and keep them from crumbling. Some prior art baskets are of frusto-conical shape. An example of such a basket with a liner is disclosed in the periodical entitled *American Nurserymen*, Dec. 15, 1974, page 23.

After the ball is positioned within the basket, the wales are crimped or twisted with a tool to tighten the basket against the ball and minimize crumbling which may damage the root or hair rootlets of a plant contained within the ball.

While the prior art wire baskets offer reinforcement to an excavated earthen ball, they require time to shape the basket to fit the ball. Also, once the wales are twisted or crimped, they may loose much of their supporting strength. Oftentimes, the wales must be severely crimped to fit earthen balls such as dug by machines as disclosed in U.S. Pat. No. 3,364,601 as issued to Korenek. This is because the shape of the balls as dug by such a machine do not match the frusto-conical shape of the baskets.

The frusto-conical wire baskets require a liner capable of being severely deformed as the wires of the basket are crimped or twisted. Liners used for such baskets must be capable of being "taken in" in several directions. Such liners cannot offer firm support to the ball. For example, liners made of square woven burlap fabric must be pulled tightly around the ball to give full support. The weft and warp threads of the fabric must be tensioned to give the ball support in those areas between the stakes and wales of the wire basket. If the fabric is not properly tightened there is a tendency for the excavated earthen ball to crumble. Too much crumbling can damage the roots or hair rootlets of the excavated plant which in turn decreases the chance of survival during transplanting.

SUMMARY OF THE INVENTION

In accordance with the invention, a wire basket is provided for reinforcing earthen balls of the type as dug by excavating apparatus as disclosed in U.S. Pat. No. 3,364,601. The basket is made of divergent stakes that are interconnected to wales. The wales are of successively increasing size and are formed of a plurality of interconnected and intersecting generally chordal segments. The included angle between connected chordal segments becomes increasingly larger with the successively larger wales. The stakes and wales define side portions or segments of the basket which have a shape that conforms more to the shape of the earthen balls as dug by the type above-mentioned apparatus.

Therefore, an object of this invention is to provide a wire basket that conforms to the shape of earthen balls as dug by excavating apparatus of the type disclosed in U.S. Pat. No. 3,364,601.

Another object of the invention is to provide a wire basket which requires a minimum of crimping and adjustment to fit the sides of excavated earthen balls.

It is another object of the invention to provide a wire basket shape which permits the use of generally rigid non-fabric liners such as cardboard.

Another object of the invention is to provide a liner basket combination for retaining excavated earthen balls.

An advantage of the invention is that less time is required to fit the basket to an excavated earthen ball than that experienced with prior art baskets.

A primary advantage of the invention is that there is less damage to excavated plants for transplanting since the basket minimizes crumbling of the excavated ball and associated damage to the root and rootlets of the excavated plant.

These and other objects or advantages of the invention will be apparent after reviewing the drawing and detailed description thereof wherein.

DESCRIPTION OF PREFERRED EMBODIMENTS

Referring to the Figures, a wire basket 10 of generally divergent shape is provided in accordance with the invention. The basket is formed of a plurality of spaced upright wires that are divergently arranged. In the basket making art, the upright wires are known as "stakes" 12.

Figure 1:
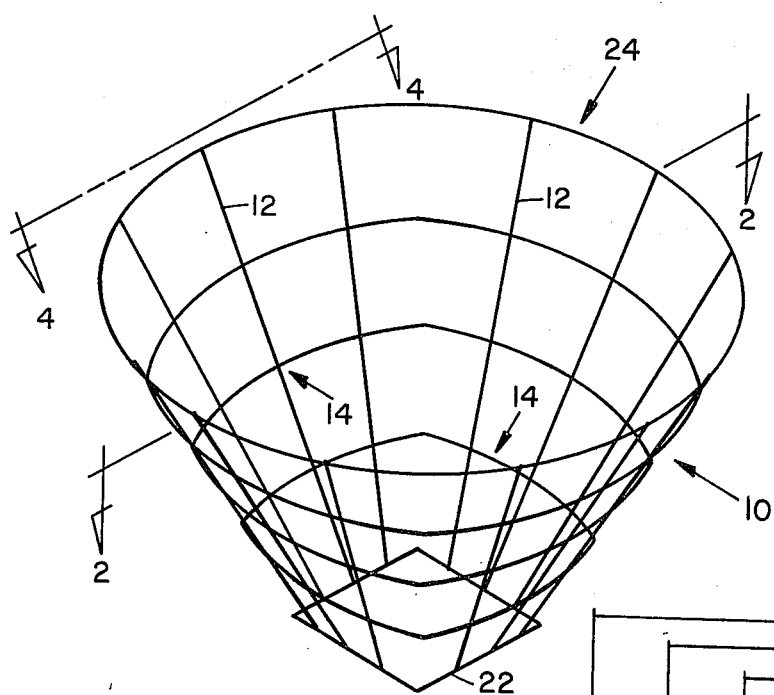
FIG. 1 is an isometric view showing a wire basket of the invention.
Figure 3:
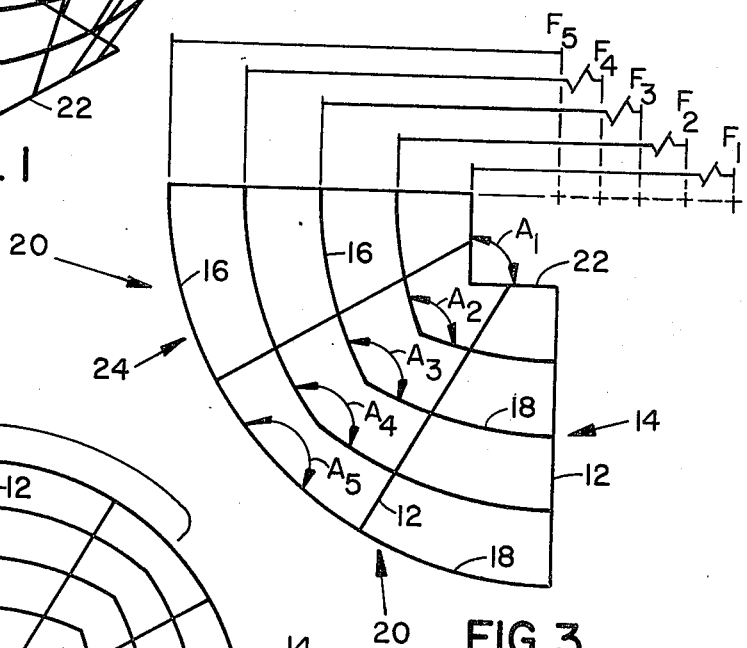
FIG. 3 is an enlarged view taken along the line 3—3 of FIG. 2.

A plurality of hoop-like wires are connected to the stakes. In basket making terms, the cross wires or hoops are known as "wales" 14. The wales 14 are of successively increasing size and lie in spaced generally parallel planes. The wales are formed of interconnected generally curved or chordal segments 16, 18. The defined angles $A_1$, $A_2$, $A_3$, $A_4$, $A_5$ between the interconnected segments become increasingly larger with successively larger wales. For example, and as shown in FIG. 3, the segments 16, 18 may define an angle $A_1$, of 90° for the smallest wale and a tangential angle $A_5$ approaching 180° for the largest wale. For reasons which will later be explained, the stakes are preferably attached to the inward side of the wales.

Figure 2:
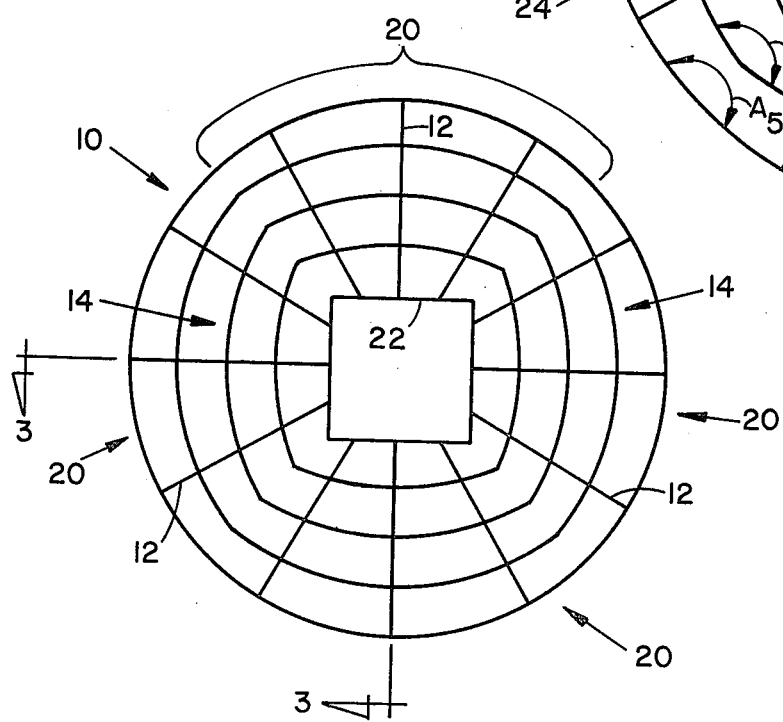
FIG. 2 is a top view taken generally in the direction 2—2 of FIG. 1.
Figure 4:
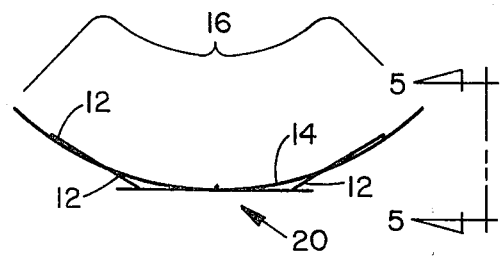
FIGS. 4 and 8 are an edge view taken generally in the direction 4—4 of FIG. 1 showing an alternative contour for the sides of the basket.
Figure 5:
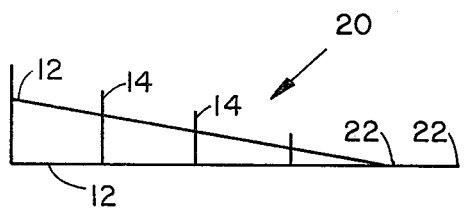
FIG. 5 is a view taken along the lines 5—5 of FIG. 4.

The interconnected stakes 12 and wales 14 define interconnected wall segments 20 of the basket. There are four wall segments in the preferable arrangement. In a preferred configuration, the segments 16, 18 of the wale have generally and eliptical shape when viewed from the top as in FIG. 2 and generally a cylindrical shape when viewed from the edge as shown in FIG. 4. The lower portion of the wall segment optionally may extend to a generally flat portion with one or more straight wale segments 22 as particularly shown in FIG. 5. The arrangement of the wales gives the basket an appearance of having a square shape at the bottom which changes to a generally round shape at the top where the wale 24 defines generally a circle. Optionally, any intermediate wale shape from the square shape at the bottom of the basket to the round shape at the top of the basket may be used. This is because excavating machines may be set to dig various size balls which correspond to the various contour of the basket. For example, the flat portion at the bottom of the basket defined by the straight wale segments 22 may be extended with more straight wales or eliminated altogether. However, the basket will have a polygon appearance at the bottom which extends into a more circular appearance at the top.

The curved wales have substantially the same general shape when viewed from the top, as for example, an ellipse. However, the focal points $F_1$, $F_2$, $F_3$, $F_4$, $F_5$ of the segments 16, 18 are not the same for successive wales. The focal points for successive wale segments 16, 18, 22 generally converge toward $F_5$ as the wales become increasingly larger from the bottom to the top of the basket. Preferably, the focal points converge such that the largest wale 24 has a common focal point $F_5$ which defines a circle and the smallest wale $F_1$ has an infinite focal point which defines the straight wale segment 22. When four wall portions are used to define a basket, the smallest wales define generally a square and the largest wale defines generally a circle.

Figure 6:
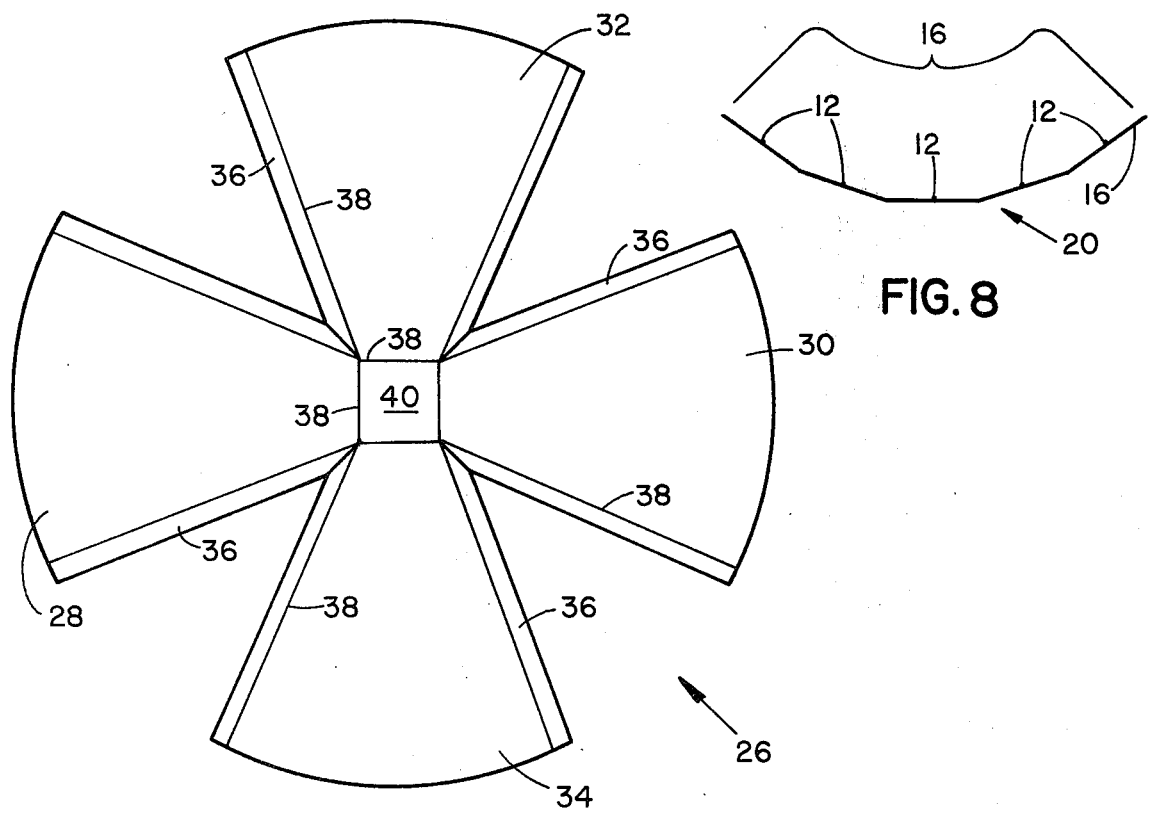
FIG. 6 is a plan view of a liner that may be used in combination with the wire basket of FIG. 1.

The basket shape makes it readily adaptable for use with generally stiff liners 26 such as cardboard. For example and as shown in FIG. 6 in plan view, a cardboard piece may be used. The shape of the cardboard is chosen such that it has at least one segment 28 and preferably oppositely facing segment 30 or all segments 32, 34 that correspond to the segments at the basket. Flaps 36 are included along at least one edge of the liner segments. The liner is foldable 38 so the flaps overlap with successively adjacent liner wall segment. The folded liner also forms a bottom 40. The cylindrical shape of the basket as defined when looking along the line 4—4, permits the use of material such as cardboard, including corrugated cardboard, since it only has to be bent in one rather than a multitude of directions. For example, it is bent cylindrically rather than spherically or conically. Of course, when the extended flat portion of the wall segment is used, the liner does not have to be bent at all at the lower portion of the basket.

Figure 7:
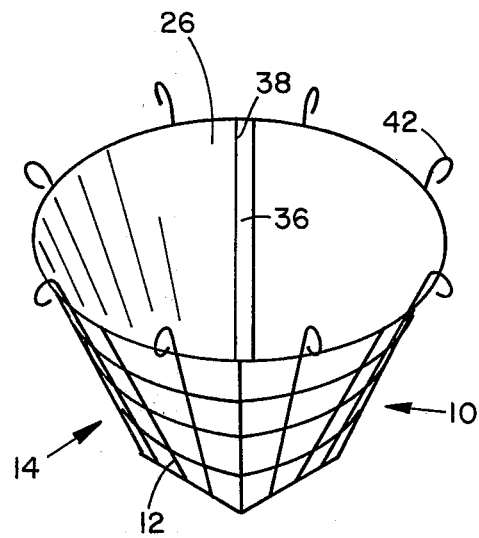
FIG. 7 shows a wire basket with liner.
Figure 8:
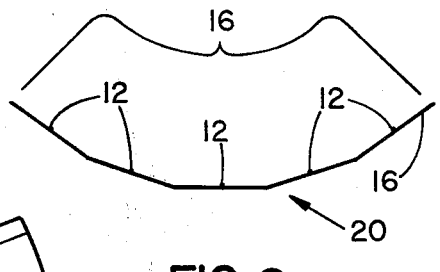

When in use, the basket is positioned to receive an excavated earthen ball as dug by apparatus discussed above. A liner is positioned in the basket (FIG. 7). A conventional liner such as of burlap or plastic may be used. However, the relatively stiff cardboard liner 26 is preferred. The excavating earthen ball is positioned into the basket with the liner. The wire basket and liner conform to the general shape of the excavated ball. This minimizes the amount of crimping which must be done in the wales to accommodate the excavated ball. When the basket is to be transplanted to another excavated site, holes may be punched in the cardboard to permit root formation past the walls and to enhance plant growth. Optionally, the cardboard may be cut along the bottom and the segments of the liner pulled out. Here, the importance of putting the stakes 12 along the inside of the wale 14 should be emphasized. The stakes define rails which aid in the easy removal of the liner. Were the stakes to be positioned on the outside of the wales, the wales would form ridges making it very difficult for the liner to be removed.

Another advantage of using the liner such as cardboard with the basket of the invention, rather than poking holes, the cardboard may be cut to form square flaps to which may be bent backwardly just before the ball is positioned in the excavated hole. This also enhances root growth.

Various combinations of basket sizes may be made. For example, the upper and lower portions of the segments may be removed or extended to match the ball as excavated by digging apparatus. For example, the lower wales may extend to define a smaller square, or the upper circular portion of the basket may be excluded. It has been determined that only a few variations of the basket are needed for most situations.

Optionally, the stakes 12 may be extended to form loops 42 to aid in tying a ball to the basket.

It should be noted that the concept of forming a wire basket with wall portions of intersecting chordal segments having an included angle which varies, presents an entirely different construction than that of a prior art generally frusto-conical wire basket. The present invention utilizes a construction which provides an entirely new wall shape that conforms more to the shape of excavated earthen balls that are dug by widely used excavating equipment.

Although the present description is limited to certain, specific embodiments, these are not intended to limit the scope of the invention which is to be determined from the appended claims.

What is claimed is:

1. A wire transplanting basket for retaining excavated earthen balls comprising:
   a plurality of generally divergent stakes; and
   a plurality of spaced wales connected to the stakes, each wale formed of a plurality of interconnected segments that have substantially the same curvature, the segments of successively spaced wales substantially aligned with each other and each having curvature focal points that converge more toward a common center than the curvature focal point segments of smaller antecedent wales.

2. A basket as set forth in claim 1 wherein the smallest wale has segments with curvature focal points that approach infinity to define substantially straight segments, and the largest wale has segments with substantially concentric curvature to define segments that form a substantially circular wale.

3. A basket as set forth in claim 1 wherein the stakes are connected to the wales at radially inward portions.

4. A basket as set forth in claim 1 wherein each wale is formed of four segments.

5. A basket as set forth in claim 4 wherein there are four segments to a wale and the substantially straight segments substantially form a square.

6. A basket as set forth in claim 1 wherein the aligned segments of successive wales and connected stakes define wall portions of the basket that are generally flat at the bottom of the basket and generally elliptical at the top of the basket.

7. A transplanting basket for retaining excavated earthen balls comprising:
   a plurality of angularly interconnected divergent wall portions of substantially the same size with substantially a cylindrical wall contour, comprising a plurality of spaced generally upright divergent wires connected to a plurality of spaced cross wires, and wherein the angular interconnection between wall portions becomes increasingly larger with the divergence of the upright wires.

8. A basket as set forth in claim 7 wherein the spaced curved cross wires between interconnected wall portions are substantially coplanar to define hoops.

9. A basket as set forth in claim 8 comprising a plurality of lower divergent wall portions interconnected and aligned with the wall portions at the converging end thereof, the lower divergent wall portions of substantially planar contour comprising an extension of the divergent wires connected to a plurality of substantially straight cross wires.

10. A basket as set forth in claim 9 wherein there are four wall portions and the straight cross wires are interconnected to substantially define a hoop with a square shape.

11. A basket as set forth in claim 8 comprising a plurality cardboard segments having substantially the same contour and number as the wall segments, a cardboard segment disposed interiorly of and adjacent to each wall portion.

12. A wire basket comprising:
 a plurality of wire hoops of successively increasing size spaced from each other in generally parallel planes, each hoop comprised of a plurality of intersecting curved segments, the intersections substantially lineally aligned and defining substantially corner portions with included angles that are successively larger from the smaller to the larger hoops; and
 a plurality of spaced generally divergent wires arranged generally transverse of and attached to the wire hoops.

13. A basket as set forth in claim 12 and further including a smallest hoop that is generally a square and a largest hoop that is generally a circle.

14. A basket as set forth in claim 12 wherein at least some of the divergent wires are extended and bent into loops above the last successive hoop.

15. In the wire basket of claim 12, the further improvement comprising:
 a liner of stiff cardboard-like material disposed in the basket, the liner comprising at least two oppositely facing wall segments of generally divergent shape with divergent sides and a small side interconnected to a common bottom segment, the wall segment each having at least one flap along one divergent side thereof that unattachably overlaps a divergent side of a wall segment.

16. The wire basket as set forth in claim 15 wherein the liner further includes third and fourth wall segments of generally divergent shape with divergent sides, the third and fourth segments with at least one flap along one divergent side thereof, the third and fourth segments interconnected to the common bottom which has a generally square shape and all segments arranged generally 90° in relation to each other, with each flap overlapping a different wall segment.

* * * * *